(12) United States Patent
Wu et al.

(10) Patent No.: US 11,308,060 B2
(45) Date of Patent: Apr. 19, 2022

(54) METHOD, APPARATUS, DEVICE AND STORAGE MEDIUM FOR MANAGING INDEX

(71) Applicant: BEIJING BAIDU NETCOM SCIENCE AND TECHNOLOGY CO., LTD., Beijing (CN)

(72) Inventors: Jian Wu, Beijing (CN); Jie Wang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 37 days.

(21) Appl. No.: 16/690,829

(22) Filed: Nov. 21, 2019

(65) Prior Publication Data

US 2020/0242097 A1    Jul. 30, 2020

(30) Foreign Application Priority Data

Jan. 29, 2019    (CN) .......................... 201910088131.2

(51) Int. Cl.
*G06F 16/22* (2019.01)
*G06F 16/215* (2019.01)
*G06F 16/23* (2019.01)
*G06F 16/248* (2019.01)

(52) U.S. Cl.
CPC ........ *G06F 16/2272* (2019.01); *G06F 16/215* (2019.01); *G06F 16/2365* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 5,727,196 A | 3/1998 | Strauss, Jr. et al. | |
| 2013/0013617 A1 | 1/2013 | Cai | |
| 2013/0317924 A1* | 11/2013 | Bush | H04W 4/80 705/16 |
| 2018/0300352 A1* | 10/2018 | Sanchez Ribes | G06F 3/1297 |
| 2019/0287419 A1* | 9/2019 | Seo | G09B 19/0053 |
| 2019/0340225 A1* | 11/2019 | Hamon | G06F 40/143 |

(Continued)

FOREIGN PATENT DOCUMENTS

| | | |
|---|---|---|
| CN | 103605777 | 2/2014 |
| CN | 103741421 | 4/2014 |

(Continued)

*Primary Examiner* — Kim T Nguyen
(74) *Attorney, Agent, or Firm* — Knobbe Martens Olson & Bear LLP

(57) ABSTRACT

Embodiments of the present disclosure relate to a method, apparatus, device and computer readable storage medium for managing an index are provided. The method for managing an index may include: determining a target index for target data stored in a database, the target index having a corresponding index tag for identifying a stored version of the target index. The method may further include acquiring, based on the target index, the target data stored in the database, the target data having a corresponding data tag for identifying a stored version of the target data. The method may further include determining, in response to the index tag not matching the data tag, an operation associated with the target index.

19 Claims, 6 Drawing Sheets

(56) References Cited

U.S. PATENT DOCUMENTS

2019/0349198 A1\* 11/2019 Patel ...................... H04L 9/3297
2020/0012488 A1\* 1/2020 Koval ....................... G06F 8/71
2020/0210395 A1\* 7/2020 Molini .................. G06F 16/219

FOREIGN PATENT DOCUMENTS

| | | | |
|---|---|---|---|
| CN | 103902698 | A | 7/2014 |
| CN | 105183915 | A | 12/2015 |
| CN | 105512325 | | 4/2016 |
| CN | 107291768 | | 10/2017 |
| CN | 108880972 | A | 11/2018 |
| EP | 1302870 | A2 | 9/2002 |
| JP | 2000003366 | | 1/2000 |
| JP | 2000501532 | | 2/2000 |
| JP | 2003281182 | | 10/2003 |
| JP | 2004265015 | | 9/2004 |
| JP | 2008165474 | | 7/2008 |
| JP | 2011053868 | | 3/2011 |
| JP | 2015210815 | | 11/2015 |
| KR | 20080046905 | | 5/2008 |

\* cited by examiner

METHOD, APPARATUS, DEVICE AND STORAGE MEDIUM FOR MANAGING INDEX

CROSS-REFERENCE TO RELATED APPLICATIONS

This application claims priority to Chinese Application No. 201910088131.2, filed on Jan. 29, 2019 and entitled "Method, Apparatus, Device and Storage Medium for Managing Index," the entire disclosure of which is hereby incorporated by reference.

TECHNICAL FIELD

Embodiments of the present disclosure relate to the field of computer technology, and more specifically to a method, apparatus, device and computer readable storage medium for managing an index.

BACKGROUND

With the increasing demand for data in various fields, database technology is becoming more and more widely applied. To make it easier to query the required data, sometimes it is necessary to create a secondary index in the database. As the data is constantly updated, some of the created indexes may no longer be suitable for the data they indicate, and such indexes need to be cleaned up. Therefore, these indexes need to be managed efficiently to improve the performance of the database. However, in the conventional index management method, it is required to perform a series of operations on each to-be-processed index and its indicated data to determine whether the index should be cleared, which reduces the performance of the database.

SUMMARY

According to an example embodiment of the present disclosure, a solution for managing an index is provided.

In a first aspect, an embodiment of the present disclosure provides a method for managing an index. The method includes: determining a target index for target data stored in a database, the target index having a corresponding index tag for identifying a stored version of the target index; acquiring, based on the target index, the target data stored in the database, the target data having a corresponding data tag for identifying a stored version of the target data; and determining, in response to the index tag not matching the data tag, an operation associated with the target index.

In a second aspect, an embodiment of the present disclosure provides an apparatus for managing an index. The apparatus includes: an index determining module, configured to determine a target index for target data stored in a database, the target index having a corresponding index tag for identifying a stored version of the target index; a data acquisition module, configured to acquire, based on the target index, the target data stored in the database, the target data having a corresponding data tag for identifying a stored version of the target data; and an operation determining module, configured to determine, in response to the index tag not matching the data tag, an operation associated with the target index.

In a third aspect, an embodiment of the present disclosure provides a device comprising: one or more processors; and a storage apparatus, for storing one or more programs, where the one or more programs, when executed by the one or more processors, cause the one or more processors to implement the method according to the first aspect.

In a fourth aspect, an embodiment of the present disclosure provides a computer readable medium, storing a computer program thereon, wherein the computer program, when executed by a processor, implements the method according to the first aspect.

It should be appreciated that the description of the Summary is not intended to limit the key or important features of embodiments of the present disclosure, or to limit the scope of the present disclosure. Other features of the present disclosure will become readily comprehensible through the following description.

BRIEF DESCRIPTION OF THE DRAWINGS

With reference to the accompanying drawings and the following detailed description, the above and other features, advantages and aspects of some embodiments of the present disclosure will become more apparent. In the accompanying drawings, the same or similar reference numerals indicate the same or similar elements.

DETAILED DESCRIPTION OF EMBODIMENTS

Figure 1:
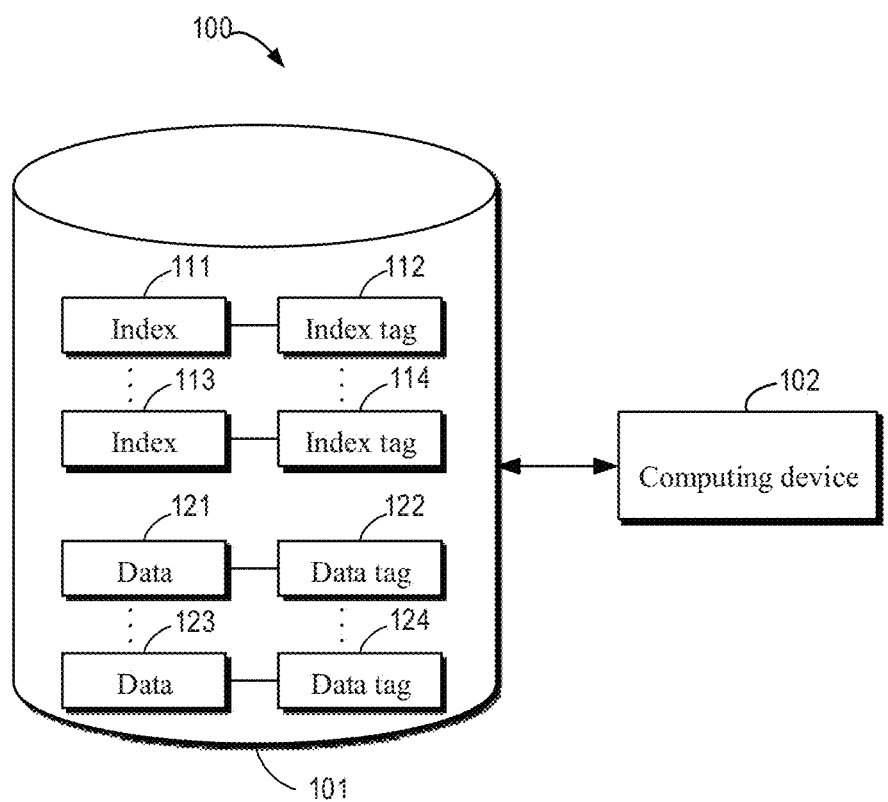
FIG. 1 shows a schematic diagram of an example environment in which an embodiment of the present disclosure may be implemented.

Embodiments of the present disclosure will be further described below in detail with reference to the accompanying drawings. Although certain embodiments of the present disclosure are shown in the accompanying drawings, it may be understood that the present disclosure may be implemented in various forms and should not be construed as limited to embodiments set forth herein. On the contrary, embodiments are provided to provide a more comprehensive and complete understanding of the present disclosure. It may be appreciated that the accompanying drawings and embodiments of the present disclosure are for illustrative purposes only and are not intended to limit the scope of the present disclosure.

In the description of embodiments of the present disclosure, the term "comprises" and the like are to be understood as open-ended, i.e., "including but not limited to". The term "based on" should be understood as "based at least in part." The term "one embodiment" or "an embodiment" should be understood as "at least one embodiment." The terms "first,"

"second," and the like may refer to different or identical objects. Other explicit and implicit definitions may also be included below.

As mentioned above, in some cases, a secondary index needs to be created in the database to better respond to a data query request. The database HBase is used as an example below. HBase is a highly reliable, high performance, column-oriented and scalable distributed storage system. A user retrieves data and performs primary key query (using a rowkey as the primary key) through the rowkey and the range of the rowkey, and can query target data in massive data with high performance. However, in practical applications, many requirements are for non-primary key queries. Although HBase provides filtering for scanning non-primary keys, data required in this method often requires a full-table scanning, which consumes a large amount of performance for the entire cluster and has low query performance, and is not applicable in a scenario with a very large data volume.

In order to use the non-primary key query, it is generally to establish an inverted index (i.e., a secondary index) for the data in the HBase source data table, and then obtain rowkey information of the corresponding HBase source data table by using the rowkey in the inverted index, thereby targeting the target data. The storage of the inverted index is related to the design, which may be the same table as the HBase source data table, or may be a separate table.

In streaming data production, the data in the HBase source data table is constantly updated, resulting in an index that is no longer suitable for the data it indicates (also referred to herein as a dirty index) in the inverted index. In this case, it is necessary to perform an exit action to clean up the dirty index. Cleaning up the dirty index while writing the data may cause a slower writing speed. For a system having high writing performance, this action is generally delayed until the data is read.

Conventionally, the delayed exit of the secondary index uses two solutions. The first solution is to delay the exit in batches. In this solution, the data read is performed simultaneously with the exit logic judgment on all the secondary indexes on the data to determine whether to clean up a certain secondary index. The second solution is to delay the exit as needed. In this solution, only the secondary index of a hit query is subjected to the exit logical judgment at the same time as the data is read, and the hit index data is affected at most.

In both conventional solutions, it is necessary to perform a series of operations (i.e., exit logic judgment) on each to-be-processed index to determine whether the index should be cleared, which reduces the performance of the database. In addition, the usage scenarios of the two conventional solutions are different, and the problems and deficiencies brought about are also different. The first solution can only be applied in scenarios with dense index accesses, and the application arrange is limited. Delayed exits in batches may result in a large number of unrelated indexes also exiting, resulting in performance degradation. The second solution may exit the index data as needed, but upon each query it is necessary to determine whether the hit index should be cleaned up, resulting in performance degradation.

According to an embodiment of the present disclosure, a solution of managing an index is proposed. In this solution, an index tag for identifying a stored version of a target index and a data tag for identifying a stored version of target data are set, and an operation associated with the target index may be determined by comparing the index tag and the data tag. In this way, the operations required for determining whether the target index should be deleted can be reduced. Therefore, the solution of the present disclosure can advantageously achieve an efficient management of the database index, thereby reducing the time overhead of subsequent calls and improving the performance of data reading.

Embodiments of the present disclosure will be specifically described below with reference to the accompanying drawings.

FIG. 1 shows a schematic diagram of an example environment 100 in which an embodiment of the present disclosure may be implemented. In the example environment 100, data 121, 123 are stored in a database 101, and the data have corresponding data tags 122, 124 for identifying stored versions of the data. The data tag may be a timestamp or a series of values defined by a predetermined rule, as long as such a tag can identify a stored version of the data. Indexes 111, 113 have corresponding index tags 112, 114 for identifying stored versions of the indexes. The index tag may be a timestamp, a series of values defined by a predetermined rule, or a predetermined tag. The data tag and the index tag will be described in detail below with reference to FIGS. 3 and 4.

The indexes 111, 113 may indicate the data that is stored in the database 101, for which they are targeted, for example, the storage location of the data for which they are targeted in the database 101 may be used to indicate the data. For example, the index 111 may be an index for the data 121. The indexes 111, 113 may be generated based on the current version or a previous version of the data stored in the database 101. For example, the indexes 111, 113 may be secondary indexes or inverted indexes.

As mentioned above, with the update of the data stored in the database 101, some indexes (e.g., indexes generated based on the previous version of the data) may no longer be suitable for indicating the data to which they originally targeted. In this case, a computing device 102 is used to manage the indexes (e.g., indexes 111, 113), such as clean up a dirty index therein. It should be understood that the environment 100 shown in FIG. 1 is merely an example and that a plurality of computing devices may be used to determine and manage indexes in the database 101. It should also be understood that the computing device 102 may be a stationary computing device or a portable computing device such as a mobile telephone, or a tablet computer.

The database 101 may be stored in the computing device 102 or may be stored remotely from the computing device 102. The computing device 102 may be deployed on the client or on the server, and the scope of the present disclosure is not limited in this respect. Although the indexes 111, 113 are shown in FIG. 1 as being stored in the same database 101 as the data 121, 123, it should be understood that the indexes 111, 113 may also be stored separately from the data 121, 123, such as in other databases.

Figure 2:
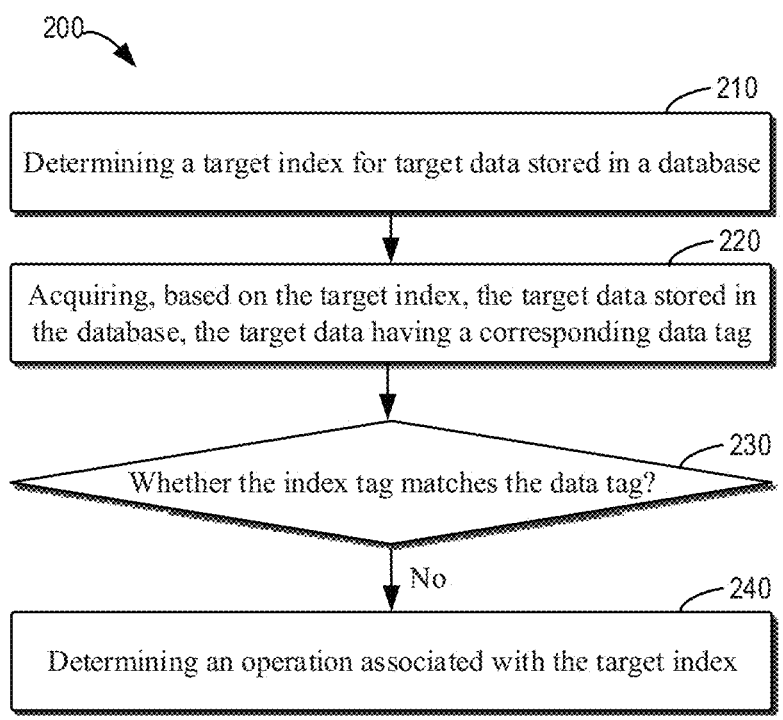
FIG. 2 shows a flowchart of a process of managing an index according to an embodiment of the present disclosure.

In order to more clearly understand the index management solution provided by embodiments of the present disclosure, an embodiment of the present disclosure will be further described with reference to FIG. 2. FIG. 2 shows a flowchart of a process 200 of managing an index according to an embodiment of the present disclosure. The process 200 may be implemented by the computing device 102 of FIG. 1. For ease of discussion, the process 200 will be described in conjunction with FIG. 1.

At block 210, the computing device 102 determines a target index for target data stored in the database 101. For ease of discussion, the index 111 will be described below as the target index, and the target data for which the target index 111 is targeted is assumed to be the data 121. The target index 111 has the corresponding index tag 112 for identifying the stored version of the target index 111. The index tag 112 may be a timestamp, a value of a series of values, or a predetermined tag.

In some embodiments, the process 200 may be combined with a data query process. The computing device 102 may receive a query request, such as a query request for the target data 121, and determine the target index 111 based on a keyword in the query request. For example, the computing device 102 receives a query request from a user and hits the target index 111 by parsing the query request.

In some embodiments, the process 200 may be performed periodically, i.e., the computing device 102 may manage the index periodically. The process 200 may also be initiated in response to, for example, an instruction from the user. In such an embodiment, the process 200 may be performed on each index in the database 101, and the target index 111 may be any index.

At block 220, the computing device 102 acquires the target data 121 stored in the database 101 based on the target index 111. The target data 121 has the corresponding data tag 122 for identifying the stored version of the target data 121. The data tag 122 may be a timestamp, a value of a series of values, or the like associated with writing or updating of the target data 121.

In some embodiments, the computing device 102 may determine a storage location of the target data 121 in the database 101 based on the target index 111 and acquire the target data 121 from the database 101 based on the determined storage location. For example, when the target index 111 and the target data 121 are stored in the same table of the database 101, the target index 111 may indicate the row of the target data 121 in the table; and when the target index 111 and the target data 121 are stored in different tables, the target index 111 may indicate the table in which the target data 121 is stored and the row of the target data 121 in the table.

Figure 3:
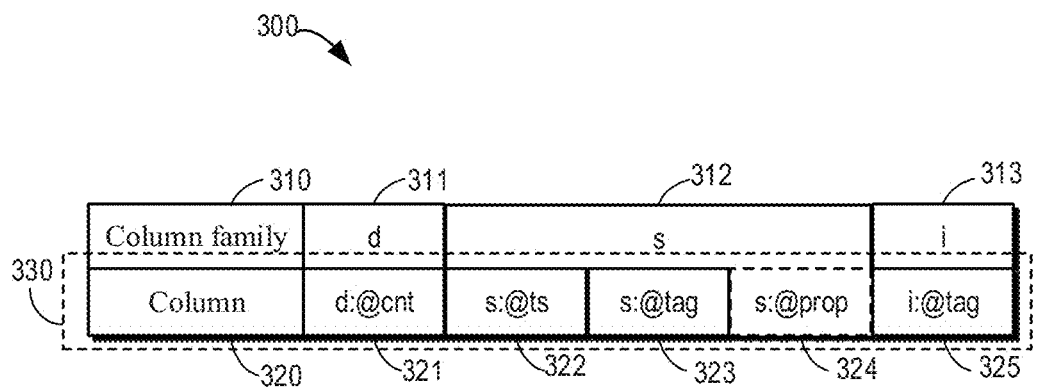
FIG. 3 shows a schematic diagram illustrating a data storage structure according to some embodiments of the present disclosure.

The relationship between the target index, the index tag, the target data, and the data tag will be explained in more detail below by way of example with reference to FIGS. 3 and 4. FIG. 3 shows a schematic diagram illustrating a data storage structure 300 according to some embodiments of the present disclosure. FIG. 3 illustrates the data storage structure HBase as an example, and it should be understood that this is merely illustrative, and embodiments of the present disclosure may be applied to data and indexes stored in any structure.

As shown in FIG. 3, an element 310 identifies that the elements of the row represent individual column families (CF), and an element 320 identifies that the elements of the row represent individual columns. The data storage structure 300 includes three column families, d column family 311 (which may also be denoted as CF: d), s column family 312 (which may also be denoted as CF: s), and i column family 313 (which may also be denoted as CF: i). The d column family 311 includes only one d:@cnt column 321 for storing source data, for example, in the format json.

The s column family 312 is used to store system fields related to the source data. For example, s:@ts column 322 may store the update time of the data in the d:@cnt column 321. s:@tag column 323 may store a data tag for identifying the stored version of data (the data may include data of the d column family 311 and the s column family 312).

The i column family 313 includes i:@tag column 325 that stores an index tag of the index, such as the index tag 112. In such an example, when row 330 is used to store index related information, d column family 311 and s column family 312 may be empty; and when row 330 is used to store data related information, i column family 313 may be empty. In this example, by assigning different column families to indexes and data, they are isolated on physical storage, which allows to specify as few data accesses as possible in the column when accessing the index, speeding up access.

A specific example is described below in conjunction with FIG. 4. FIG. 4 shows a schematic diagram illustrating a table 400 storing index tags and data tags according to some embodiments of the present disclosure. The upper portion of the table 400 is used to store index related information, and the lower portion is used to store data related information. Row 430 includes a rowkey 421 (15 in this example) of the data, source data 422, update time 423 (T1), and a data tag 424 (T1). In this example, the data tag 424 is a timestamp corresponding to the writing of the source data 422. The data stored in the row 430 is a specific example of the target data 121 in FIG. 1, and the data tag 424 is a specific example of the data tag 122 in FIG. 1.

Indexes 411 and 413 are generated according to a predefined rule based on the data stored in the row 430 (e.g., the source data 422). The indexes 411 and 413 have corresponding index tags 412 and 414, respectively. Taking the index 411 as an example, `Act_@type_15 indicates that the attribute value corresponding to the attribute "type" is "Act" for the targeted target data, and the target data is stored in the row with the rowkey of 15. In the example of FIG. 4, the indexes 411 and 413 are generated when the source data 422 is written, and thus have an index tag matching the data tag 424, that is, both are the timestamp T1. The indexes 411 and 413 are specific examples of the target index 111 in FIG. 1, and the index tags 412 and 414 are specific examples of the index tag 112 in FIG. 1.

If at time T2, the data in the row 430 is updated, for example, the attribute value of the attribute "type" is modified to ["Act1", "TVPlay1"], the data tag 424 may be updated to a timestamp T2. At the same time, new indexes may be generated, such as `Act1_@type_15 and `TVPlay1_@type 15, and the index tags corresponding to the two new indexes may be set to the timestamp T2. In this case, the indexes 411 and 413 are no longer suitable for indicating the data stored in the row 430, and the index tags 412 and 414 also do not match the data tag 424. In an embodiment of the present disclosure, the data tag and the index tag may also be referred to as a data trust tag and an index trust tag (sometimes collectively referred to as a trust tag) respectively.

Figure 4:
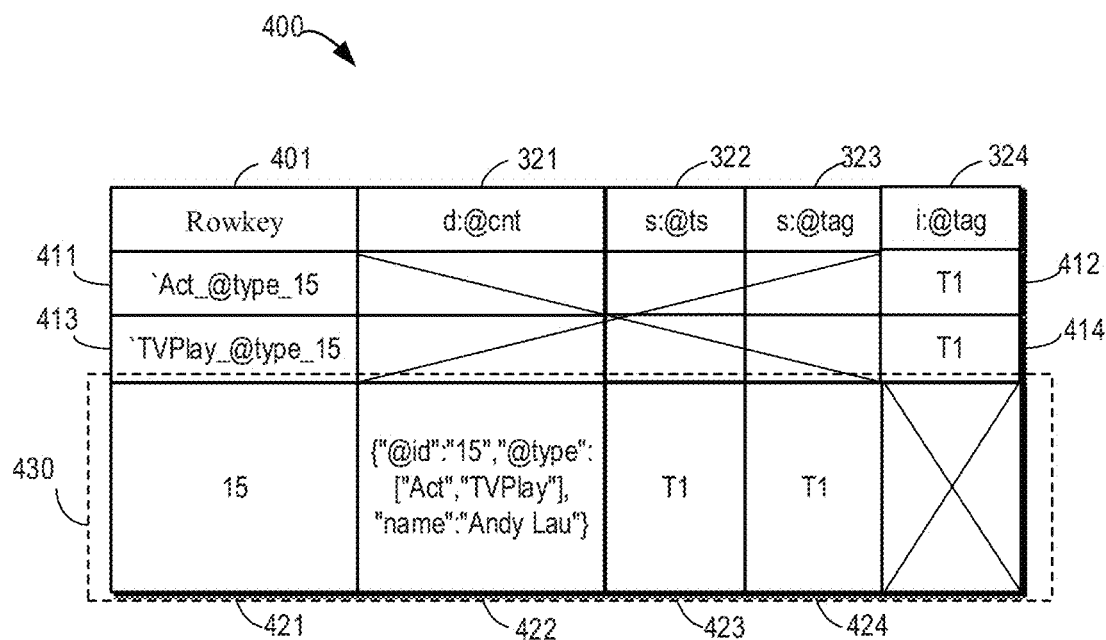
FIG. 4 shows a schematic diagram illustrating a table storing index tags and data tags according to some embodiments of the present disclosure.

In the example of FIG. 4, the data tag and the index tag take the form of a timestamp. The timestamp is an incrementing field and when the data changes, the timestamp may be modified so that the data trust tag no longer matches the index trust tag, triggering the deletion (or exit) mechanism of the dirty index. Therefore, using a timestamp as a trust tag may simply identifying the stored versions of the data and the index.

Other forms of data tags and index tags may also be used, for example, a predefined incremental sequence. For example, an arithmetic progression having a common difference of d may be used as trust tags. When the data is initially written into the database 101, the data tag is set to a, and the index tag of the generated index is also set to a. When the data is modified, the data tag is incremented by d to become a+d, and the index tag of the generated new index is set to a+d. In this case, the index tag (value a) of the old index is different from the data tag (a+d), and they are considered to be mismatching. As another example, an arithmetic progression having a common difference of 2 may also be used as the trust tags. When the data is initially written into the database 101, the data tag is set to b, and the index tag of the generated index is set to b+1. When the data is modified, the data tag is incremented by 2 to become b+2, and the index tag of the generated new index is set to (b+1)+2.

In the examples of FIGS. 3 and 4, the data and the data index are stored in the same table and are distinguished by different column families. For databases such as HBase, the data is acquired by specifying a column family. Therefore, one advantage of such a trust tag storage design is that the @trust column (i.e., the trust tag) under the column family is acquired simultaneously when the data is acquired, without the need to add an additional request. It should be understood that embodiments of the present disclosure may also be applied to the situation that the data and the data index are stored in different tables.

In some embodiments, to facilitate modification of the source data in the d:@cnt column 321, the s column family 312 may include one or more s:@prop columns 324 (see FIG. 3), storing one or more fields (which may also be referred to herein as an intervention field) used for modifying the source data in the d:@cnt column 321. The data finally outputted in this case is the final data generated by the combination of the d column family 311 and the s column family 312, and the data of the same field is subject to CF:s. This will be described below in conjunction with FIG. 5.

Figure 5:
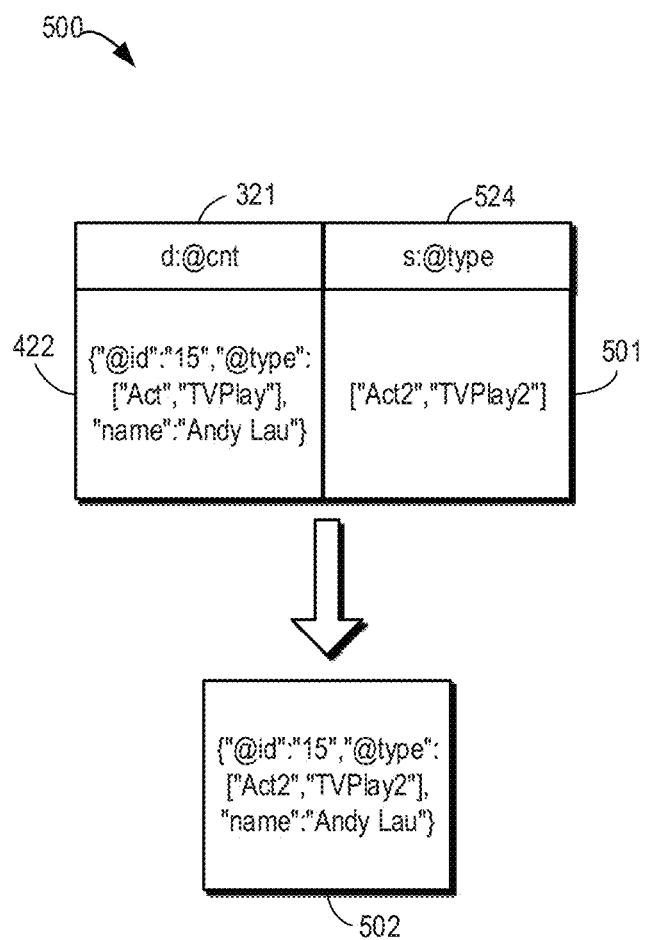
FIG. 5 shows a schematic diagram illustrating an intervention field according to some embodiments of the present disclosure.

FIG. 5 shows a schematic diagram 500 illustrating an intervention field according to some embodiments of the present disclosure. s:@type column 524 as shown in FIG. 5 may be considered a concrete implementation of s:@prop column 324 for modifying or interfering with the attribute value of the attribute "type" in the source data 422. As shown in the figure, in the case where an intervention field 501 is ["Act2", "TVPlay2"], a final output result 502 may be different from the source data 422. The intervention field has a higher priority than the source data.

In such an embodiment, the index tag may also include a predetermined tag in addition to a timestamp or an arithmetic progression, the predetermined tag may be used to indicate that the correlation of the target index with the target data is indeterminate. For example, the predetermined tag may be the character NULL. For example, when the source data 422 is updated and the intervention field 501 is not updated, the index tag of the generated index may be set to a predetermined tag such as NULL.

With further reference to FIG. 2, at block 230, the computing device 102 determines whether the index tag 112 matches the data tag 122. In the case where the index tag 112 and the data tag 122 are timestamps of the same format, if the index tag 112 and the data tag 122 are identical, they are considered to be matched; and if the index tag 112 and the data tag 122 are different, they are considered to be mismatching. In the case that both the index tag 112 and the data tag 122 are timestamps but in different formats, if the index tag 112 and the data tag 122 indicate the same time, they are considered to be matched; and if the index tag 112 and the data tag 122 indicate different times, they are considered to be mismatching.

In the case where the index tag 112 and the data tag 122 use the arithmetic progression having the common difference d as described above, if the index tag 112 and the data tag 122 are identical, they are considered to be matched; and if the index tag 112 and the data tag 122 are different, they are considered to be mismatching. In the case where the index tag 112 and the data tag 122 use the arithmetic progression having the common difference 2 as described above, if the index tag 112 is 1 greater than the data tag 122, they are considered to be matched; otherwise they are considered to be mismatching.

In an embodiment where the index tag includes a predetermined tag such as NULL as described above, if the index tag 112 is the predetermined tag, the index tag 112 is considered to be mismatched with the data tag 122.

If it is determined at block 230 that the index tag 112 does not match the data tag 122, the process 200 proceeds to block 240. At block 240, the computing device 102 determines an operation associated with the target index 111. For example, the computing device 102 may perform an exit logic process for the target index 111 to determine if the target index 111 should be deleted. This process will be described below in conjunction with FIG. 6.

If it is determined at block 230 that the index tag 112 matches the data tag 122, it means that the target index 111 has a correlation with the target data 121 and may be used to indicate the target data 121. In this case, the target index 111 and the index tag 112 of the target index 111 may be kept.

In an embodiment in which the process 200 is combined with a data query process (as mentioned above with reference to block 210), if it is determined that the index tag 112 matches the data tag 122, the computing device 102 may provide a response to the query request based on the target data 121. For example, the computing device 102 may determine a query result based on the target data 121 and provide the query result as the response to the query request. Without the intervention field described above, the computing device 102 may directly provide a corresponding portion of the target data 121 (e.g., the source data 422) as the query result. With the intervention field described above (e.g., the intervention field 501), the computing device 102 may determine the query result 502 based on the source data 422 and the intervention field 501 (see FIG. 5) and provide the query result 502 as the response to the query request.

The process 200 of managing an index according to an embodiment of the present disclosure is described above. In this way, the data tag and the index tag may be used to indicate the correlation between the target index and the target data, and based on this, it is determined whether the target index is to be cleaned up. Therefore, the solution of the present disclosure can efficiently manage database indexes, thereby reducing the time overhead of subsequent calls and improving the performance of data reading.

Figure 6:
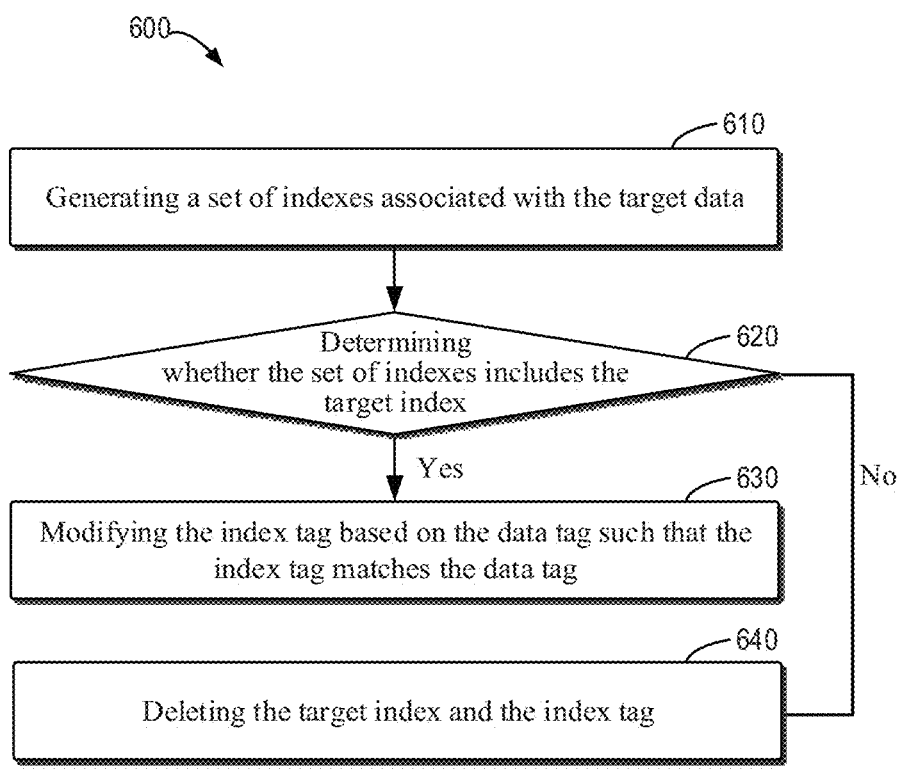
FIG. 6 shows a flowchart of a process of determining an operation associated with a target index according to some embodiments of the present disclosure.

FIG. 6 shows a flowchart of a process 600 of determining an operation associated with a target index according to some embodiments of the present disclosure. The process 600 may be implemented by the computing device 102 in FIG. 1 and may be considered a specific implementation of block 240 in FIG. 2.

If it is determined that the index tag 112 does not match the data tag 122, then at block 610, the computing device 102 generates a set of indexes associated with the target data 121. The computing device 102 may parse the target data 121 and generate the set of indexes according to the same predetermined rule as generating the target index 111. For example, the computing device 102 may parse the target data 121 to generate the set of indexes for the attribute "type." If the target data 121 includes the source data and an intervention field, when generating the set of indexes, the computing device 102 needs to first merge the source data and the intervention field and then generate the set of indexes based on the merged data.

At block 620, the computing device 102 determines whether the set of indexes generated at block 610 includes the target index 111. If the set of indexes includes the target index 111, meaning that the target index 111 is related to the target data 121, then the process 600 proceeds to block 630. At block 630, the computing device 102 modifies the index tag 112 based on the data tag 122 such that the index tag 112 matches the data tag 122. For example, in the case where the trust tag is a timestamp, the computing device 102 may modify the index tag 112 to the same timestamp as the data tag 122.

For the case where the target data 121 includes source data and an intervention field, the index tag may also be a predetermined tag such as NULL. Thus, in some embodiments, the computing device 102 may determine whether the index tag 112 is the predetermined tag, and the predetermined tag indicates that the correlation of the target index 111 with the target data 121 is indeterminate. If it is determined that the index tag 112 is the predetermined tag, the computing device 102 may modify the index tag 112 to the data tag 122.

In an embodiment in conjunction with the data query process (as referred to above with reference to block 210), at block 630, the computing device 102 may also provide a response to the query based on the target data 121. For example, as described above with respect to FIG. 2, the computing device 102 may determine the query result based on the target data 121 and provide the query result as the response to the query request.

If the computing device 102 determines at block 620 that the set of indexes does not include the target index 112, it means that the target index 111 should no longer indicate the target data 121, i.e., the target index 111 has become a dirty index that needs to be cleaned up. In this case, the process 600 proceeds to block 640. At block 640, the computing device 102 deletes the target index 111 and the index tag 112. That is, the computing device 102 performs a dirty index exit operation.

Herein, the process 600 described in conjunction with FIG. 6 may be referred to as exit logic processing. As mentioned above, in the data query process, for the case where the data tag and the index tag match each other, the query result may be directly provided without performing the exit logic processing. This mainly optimizes two problems in the existing solution of exiting as needed: one problem is that the data needs to be parsed for each query, and the other problem is that whether the target index is included in the indexes generated for the target data needs to be determined for each query. Therefore, in such an embodiment, the efficiency of data query and the read performance of the database may be improved by the use of data tag and index tag.

In order to use the index tag and the data tag, the computing device 102 needs to generate the target index 111 and the index tag 112 based on the target data 121. For the case where the target data 121 does not contain an intervention field, if it is determined that the target data 121 is to be written or has been written to the database 101, the computing device 102 may generate the target index 111 and the data tag 122, and determine the index tag 112 based on the generated data tag 122. For example, when the target data 121 is initially written to the database 101, or when the update of the target data 121 involves a field related to the index (the configuration field of the index), the target index 111 and the data tag 122 are generated, for example, the data tag 122 is the timestamp when the target data 121 is initially written or updated. The computing device 102 may then set the index tag 112 based on the data tag 122 to match the two. For example, the computing device 102 may set the index tag 112 to the same timestamp as the data tag 122.

The case where the target data 121 includes source data and an intervention field for modifying the source data (such as shown in FIG. 5) is considered below. If the target index 111 is generated when the target data 121 is initially written to the database 101, the setting of the index tag 112 is the same as the case where the intervention field is not included, that is, set to match the data tag 122. If the target index 111 is generated when the target data 121 is updated, it is necessary to consider whether the source data or the intervention field is updated. If it is determined that the source data of the target data 121 is to be updated or has been updated, the computing device 102 may generate the target index 111 (in the case the update involves a field related to the index), and determine the corresponding index tag 112 as a predetermined tag, such as NULL, and the predetermined tag indicates that the correlation of the target index 111 with the target data 121 is indeterminate. This is because the intervention field has a higher priority than the source data, and the intervention field is not read when the source data is updated, resulting in an unknown correlation between the target index and the target data.

The case where the target data includes the two parts of the source data and an intervention field will be described with further reference to the examples in FIGS. 3, 4, and 5. The update of the data tag is divided into the update of two column families of the d column family 311 and the s column family 312: (1) When the d column family 311 (i.e., d:@cnt column 321) is updated, that is, when the source data is updated, the data tag is updated, since the d column family 311 holds the original processing data, the data tag must be updated as long as there is a modification; and (2) when the s column family 312 is updated, the data tag is updated only when the updated field is contained in a field related to the index; otherwise it is not processed. For the example in FIG. 4, the data tag is updated only when the updated field is related to the "type" field; and if the updated field is "name", the data tag is not updated.

The update of the index tag is divided into the following three cases: (1) when the d column family 311 data is initialized, the index tag matching the data tag is directly written; (2) when the update of the d column family 311 causes the index to be written (i.e., when updating a field related to the index), in order to improve the write performance, the s column family 312 of the old data is not read to merge at the time of data writing, causing the correlation between the index and the data indeterminate, so that index tag corresponding to the generated index is set to a predetermined tag such as NULL; (3) when the update of the s column family 312 causes the index to be written, if the updated field relates to the field related to the index, the index tag is set to be matched with the data tag, otherwise no processing is performed.

Figure 7:
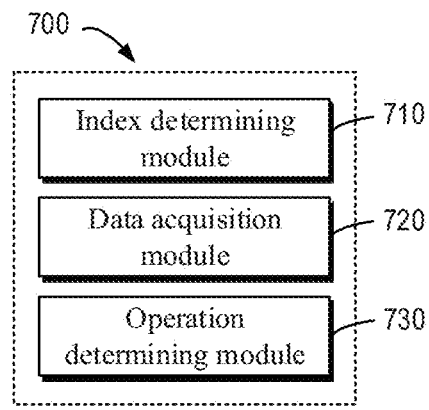
FIG. 7 shows a schematic block diagram of an apparatus for managing an index according to an embodiment of the present disclosure.

FIG. 7 shows a schematic block diagram of an apparatus 700 for managing an index according to an embodiment of the present disclosure. As shown in FIG. 7, the apparatus 700 includes: an index determining module 710, configured to determine a target index for target data stored in a database, the target index having a corresponding index tag for identifying a stored version of the target index; a data acquisition module 720, configured to acquire, based on the target index, the target data stored in the database, the target data having a corresponding data tag for identifying a stored version of the target data; and an operation determining module 730, configured to determine, in response to the index tag not matching the data tag, an operation associated with the target index.

In some embodiments, the operation determining module 730 includes: a data parsing module, configured to generate a set of indexes associated with the target data; an index determining module, configured to determine whether the set of indexes includes the target index; and a tag modification module, configured to modify, in response to the set of indexes including the target index, the index tag based on the data tag such that the index tag matches the data tag.

In some embodiments, the tag modification module includes: a tag determining module, configured to determine whether the index tag is a predetermined tag, the predetermined tag indicating that a correlation of the target index with the target data is indeterminate; and a predetermined modification module, configured to modify the index tag to the data tag, in response to determining that the index tag is the predetermined tag.

In some embodiments, the apparatus 700 further includes: an index deletion module, configured to delete, in response to the set of indexes not including the target index, the target index and the index tag.

In some embodiments, the index determining module 710 includes: a request receiving module, configured to receive a query request for the target data; and a target determining module, configured to determine the target index based on a keyword in the query request.

In some embodiments, the apparatus 700 further includes: a result determining module, configured to determine a query result based on the target data in response to the index tag matching the data tag; and a result providing module, configured to provide the query result as a response to the query request.

In some embodiments, the data acquisition module 720 includes: a location determining module, configured to determine a storage location of the target data in the database based on the target index; and a target acquisition module, configured to acquire the target data from the database based on the storage location.

In some embodiments, the apparatus 700 further includes: a tag generation module, configured to generate the target index and the index tag based on the target data.

In some embodiments, the tag generation module includes: a first index generation module, configured to generate the target index and the data tag, in response to determining that the target data is to be written to the database; and an index tag determining module, configured to determine the index tag based on the generated data tag.

In some embodiments, the target data includes source data and an intervention field for modifying the source data, and where the tag generation module includes: a second index generation module, configured to generate the target index, in response to determining that the source data of the target data is to be updated; and a predetermined tag determining module, configured to determine the index tag to be a predetermined tag, the predetermined tag indicating that a correlation of the target index with the target data is indeterminate.

Figure 8:
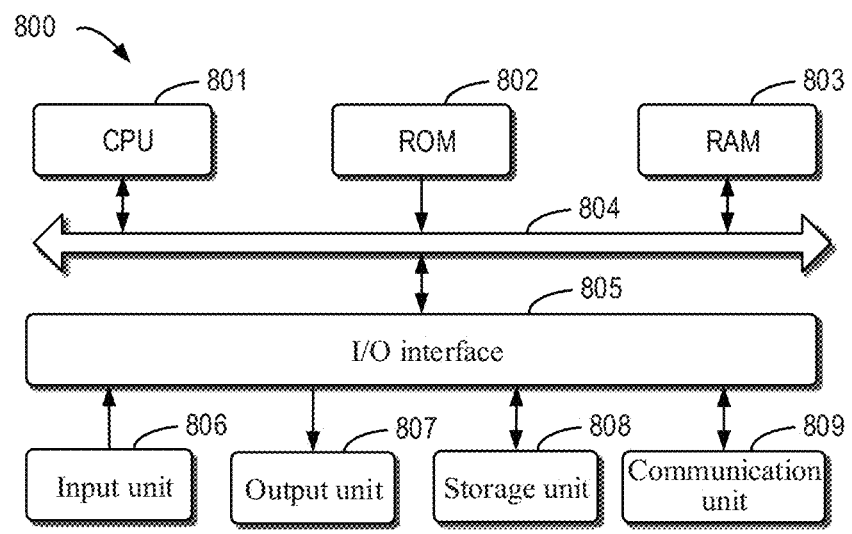
FIG. 8 shows a block diagram of a computing device capable of implementing various embodiments of the present disclosure.

FIG. 8 shows a schematic block diagram of an example device 800 capable of implementing various embodiments of the present disclosure. The device 800 may be used to implement the apparatus 800 for managing an index of the present disclosure. As shown in the figure, the device 800 includes a central processing unit (CPU) 801 that may perform various appropriate actions and processing in accordance with computer program instructions stored in a read only memory (ROM) 802 or computer program instructions loaded into a random access memory (RAM) 803 from a storage unit 808. In the RAM 803, various programs and data required for the operation of the device 800 may also be stored. The CPU 801, the ROM 802, and the RAM 803 are connected to each other through a bus 804. An input/output (I/O) interface 805 is also coupled to the bus 804.

A plurality of components in the device 800 are coupled to the I/O interface 805, including: an input unit 806, such as a keyboard or a mouse; an output unit 807, such as various types of displays, or speakers; the storage unit 808, such as a disk or an optical disk; and a communication unit 809 such as a network card, a modem, or a wireless communication transceiver. The communication unit 809 allows the device 800 to exchange information/data with other devices over a computer network such as the Internet and/or various telecommunication networks.

The processing unit 801 performs the various methods and processes described above, such as the process 200 and/or the process 600. For example, in some embodiments, the process 200 and/or the process 600 may be implemented as a computer software program that is tangibly embodied in a machine readable medium, such as the storage unit 808. In some embodiments, some or all of the computer programs may be loaded and/or installed onto the device 800 via the ROM 802 and/or the communication unit 809. When a computer program is loaded into the RAM 803 and executed by the CPU 801, one or more of the actions or steps of the process 200 and/or the process 600 described above may be performed. Alternatively, in other embodiments, the CPU 801 may be configured to perform the process 200 and/or the process 600 by any other suitable means (e.g., by means of firmware).

The functions described herein above may be performed, at least in part, by one or more hardware logic components. For example, and without limitation, types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing a method according to some embodiments the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various operations are described in a specific order, this should not be understood that such operations are required to be performed in the specific order shown or in sequential order, or all illustrated operations should be performed to achieve the desired result. Multi-tasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although embodiments of the present disclosure are described in language specific to structural features and/or method logic actions, it should be understood that the subject matter defined in the appended claims is not limited to the specific features or actions described above. Instead, the specific features and actions described above are merely example forms of implementing the claims.

What is claimed is:

1. A method for managing an index, comprising:
   determining a target index for target data stored in a database, the target index including a corresponding index tag for identifying a stored version of the target index, wherein the target index indicates a storage location of the target data in the database;
   acquiring, based on the target index, the target data stored in the database, the target data including a corresponding data tag for identifying a stored version of the target data, wherein the index tag and the data tag are stored in different positions of the database;
   determining that the index tag of the target index does not match the data tag of the target data; and
   determining, in response to the index tag not matching the data tag, an operation associated with the target index by:
      generating a set of indexes associated with the target data;
      determining whether the set of indexes includes the target index; and
      modifying, in response to the set of indexes including the target index, the index tag based on the data tag such that the index tag matches the data tag.

2. The method according to claim 1, wherein modifying the index tag comprises:
   determining whether the index tag is a predetermined tag, the predetermined tag indicating that a correlation of the target index with the target data is indeterminate; and
   modifying the index tag to the data tag, in response to determining that the index tag is the predetermined tag.

3. The method according to claim 1, further comprising:
   deleting, in response to the set of indexes not including the target index, the target index and the index tag.

4. The method according to claim 1, wherein determining the target index comprises:
   receiving a query request for the target data; and
   determining the target index based on a keyword in the query request.

5. The method according to claim 4, further comprising:
   determining a query result based on the target data in response to the index tag matching the data tag; and
   providing the query result as a response to the query request.

6. The method according to claim 1, wherein acquiring the target data comprises:
   determining the storage location of the target data in the database based on the target index; and
   acquiring the target data from the database based on the storage location.

7. The method according to claim 1, further comprising:
   generating the target index and the index tag based on the target data.

8. The method according to claim 7, wherein generating the target index and the index tag comprises:
   generating the target index and the data tag, in response to determining that the target data is to be written to the database; and
   determining the index tag based on the generated data tag.

9. The method according to claim 7, wherein the target data comprises source data and an intervention field for modifying the source data, and wherein generating the target index and the index tag comprises:
   generating the target index, in response to determining that the source data of the target data is to be updated; and
   determining the index tag to be a predetermined tag, the predetermined tag indicating that a correlation of the target index with the target data is indeterminate.

10. The method according to claim 1, wherein the target index, the target data, the index tag and the data tag are stored in a given table, and wherein the target index and the index tag are in a given first row of the given table, the target data and the data tag are in a given second row of the given table, and each of the target index, the target data, the index tag and the data tag is in a different column of the given table.

11. The method according to claim 1, wherein the index tag is a first timestamp and the data tag is a second timestamp, and wherein determining that the index tag of the target index does not match the data tag of the target data comprises determining that the first timestamp is not identical to the second timestamp.

12. An apparatus for managing an index, comprising:
    at least one processor; and
    a memory storing instructions, the instructions, when executed by the at least one processor, cause the at least one processor to perform operations, the operations comprising:
    determining a target index for target data stored in a database, the target index including a corresponding index tag for identifying a stored version of the target index, wherein the target index indicates a storage location of the target data in the database;
    acquiring, based on the target index, the target data stored in the database, the target data including a corresponding data tag for identifying a stored version of the target data, wherein the index tag and the data tag are stored in different positions of the database;
    determining that the index tag of the target index does not match the data tag of the target data; and
    determining, in response to the index tag not matching the data tag, an operation associated with the target index by:
       generating a set of indexes associated with the target data;

determining whether the set of indexes includes the target index; and modifying, in response to the set of indexes including the target index, the index tag based on the data tag such that the index tag matches the data tag.

13. The apparatus according to claim 12, wherein modifying the index tag comprises:

determining whether the index tag is a predetermined tag, the predetermined tag indicating that a correlation of the target index with the target data is indeterminate; and modifying the index tag to the data tag, in response to determining that the index tag is the predetermined tag.

14. The apparatus according to claim 12, wherein the operations further comprise:

deleting, in response to the set of indexes not including the target index, the target index and the index tag.

15. The apparatus according to claim 12, wherein acquiring the target data comprises:

determining the storage location of the target data in the database based on the target index; and acquiring the target data from the database based on the storage location.

16. The apparatus according to claim 12, wherein the operations further comprise:

generating the target index and the index tag based on the target data.

17. The apparatus according to claim 16, wherein generating the target index and the index tag comprises:

generating the target index and the data tag, in response to determining that the target data is to be written to the database; and determining the index tag based on the generated data tag.

18. The apparatus according to claim 16, wherein the target data comprises source data and an intervention field for modifying the source data, and wherein generating the target index and the index tag comprises:

generating the target index, in response to determining that the source data of the target data is to be updated; and determining the index tag to be a predetermined tag, the predetermined tag indicating that a correlation of the target index with the target data is indeterminate.

19. A non-transitory computer readable storage medium, storing a computer program thereon, wherein the computer program, when executed by a processor, causes the processor to perform operations, the operations comprising:

determining a target index for target data stored in a database, the target index including a corresponding index tag for identifying a stored version of the target index, wherein the target index indicates a storage location of the target data in the database;

acquiring, based on the target index, the target data stored in the database, the target data including a corresponding data tag for identifying a stored version of the target data, wherein the index tag and the data tag are stored in different positions of the database;

determining that the index tag of the target index does not match the data tag of the target data; and determining, in response to the index tag not matching the data tag, an operation associated with the target index by:

generating a set of indexes associated with the target data;

determining whether the set of indexes includes the target index; and modifying, in response to the set of indexes including the target index, the index tag based on the data tag such that the index tag matches the data tag.

* * * * *